United States Patent
Lin et al.

(10) Patent No.: US 8,412,480 B2
(45) Date of Patent: Apr. 2, 2013

(54) METHOD FOR DETERMINING THE ANGULAR MAGNITUDE OF IMAGING ACQUIRING APPARATUS AND VEHICLE COLLISION WARNING SYSTEM USING THEREOF

(75) Inventors: Che-Chung Lin, Hsinchu (TW); Yu-Long Wang, Tainan (TW); Chi-Wei Lin, Taipei County (TW); Dau-Chen Huang, Taichung County (TW); Yi-Yu Chang, Kaohsiung (TW)

(73) Assignee: Industrial Technology Research Institute, Hsin-Chu (TW)

( * ) Notice: Subject to any disclaimer, the term of this patent is extended or adjusted under 35 U.S.C. 154(b) by 822 days.

(21) Appl. No.: 12/407,106

(22) Filed: Mar. 19, 2009

(65) Prior Publication Data

US 2010/0134265 A1    Jun. 3, 2010

(30) Foreign Application Priority Data

Dec. 3, 2008    (TW) .............................. 97147007 A

(51) Int. Cl.
*G01C 21/00*    (2006.01)

(52) U.S. Cl. .......... 702/94; 702/104; 348/135; 348/148; 348/118; 348/180

(58) Field of Classification Search .................. None
See application file for complete search history.

(56) References Cited

U.S. PATENT DOCUMENTS

| | | | | |
|---|---|---|---|---|
| 4,942,533 A | * | 7/1990 | Kakinami et al. | 701/225 |
| 5,355,118 A | * | 10/1994 | Fukuhara | 340/435 |
| 2001/0006554 A1 | * | 7/2001 | Kakinami | 382/104 |
| 2001/0012985 A1 | * | 8/2001 | Okamoto et al. | 702/94 |
| 2004/0133376 A1 | * | 7/2004 | Uffenkamp et al. | 702/104 |
| 2008/0007619 A1 | * | 1/2008 | Shima et al. | 348/118 |
| 2008/0159653 A1 | * | 7/2008 | Dunki-Jacobs et al. | 382/293 |
| 2008/0198229 A1 | * | 8/2008 | Hongo | 348/148 |
| 2009/0015675 A1 | * | 1/2009 | Yang | 348/148 |

FOREIGN PATENT DOCUMENTS

| | | |
|---|---|---|
| TW | I245715 | 12/2005 |
| TW | M300635 | 11/2006 |
| TW | M318539 | 9/2007 |

OTHER PUBLICATIONS

Lin et al. ("Design a Support Vector Machine-based Intelligent System for Vehicle Driving Safety Warning" IEEE Oct. 12-15, 2008).*

\* cited by examiner

*Primary Examiner* — Christopher S Kelley
*Assistant Examiner* — Mohammed Jebari
(74) *Attorney, Agent, or Firm* — WPAT PC; Justin King

(57) ABSTRACT

The invention provides a method for determining the angular magnitude of an imaging acquiring apparatus, which is capable of obtaining an arranging angular magnitude with respect to the imaging acquiring apparatus in various environments by an iteration algorithm having parameters of position of a calibrating tool with respect to an image coordinate system and characteristic value corresponding to a spatial coordinate system respectively. Meanwhile, the present further provides a vehicle collision warning system which functions to obtain the relative distance between the carrier and objects around according to the image acquired by the imaging acquiring apparatus and the angular magnitude and height of the imaging acquiring apparatus. By means of the method disclosed in the present invention, the procedure to detect the angular magnitude of the image acquiring apparatus is more convenient and accurate such that the convenience for using the vehicle collision warning system is capable of being improved.

23 Claims, 8 Drawing Sheets

METHOD FOR DETERMINING THE ANGULAR MAGNITUDE OF IMAGING ACQUIRING APPARATUS AND VEHICLE COLLISION WARNING SYSTEM USING THEREOF

FIELD OF THE INVENTION

The present invention relates to a safety warning technique for carrier, and more particularly, relates to a method for determining installed angle of an image acquiring apparatus on a carrier and a collision warning system for safety warning according the installed angle and the image around the carrier.

BACKGROUND OF THE INVENTION

With the gradual development of technology and affluent society, automobiles are available to every household for bringing convenience of traffic as well as the convenience is also gradually improved due to the progress of the automobile technology. However, with the popularizing of the utilization of automobiles, the casualties caused by automobile accidents are getting higher and higher. According statistics over the years published by ministry of the Interior of R.O.C, the number of death due to the automobile accidents is around 3000 each year in Taiwan area while the injured people are around 200,000. For example, in year 2005, the number of death and injured persons are 2,894 and 200,009 respectively, i.e. an average of 8 persons died daily due to the traffic accidents.

Analyzing the cause of accidents, it reveals that 97% of automobile accidents are caused by inappropriate driving behavior, and the most frequent type of automobile accident is the rear-end collision. The accidents not only cause mental or physical burdens to each individual or family but also consume the limited medical resources of the society and cause the loss of productivity of the country. In regard to this, if it is possible for building a collision warning system by image acquiring apparatus with advanced image processing techniques for identifying the other vehicles around and estimating the relative distance therebetween and issuing an alarm signal while the relative distance is too close so that the driver is capable of proceeding an appropriate operation such as lowing speed for preventing automobile accidents from being occurred and reducing incidence rate of automobile accidents.

However, while estimating the relative distance between the carrier and other vehicles around, it is necessary to obtain the angular information between the image acquiring apparatus and ground. The conventional art like U.S. Pat. No. 4,942,533 provided a technique for detecting a relative distance to a second vehicle at a position in a monitoring direction in front of the first vehicle. A vanishing point is determined by extracting, for example, the continuous or intermittently continuous white lines dividing traffic lanes on the road on the basis of spatial changes in the features of the scene ahead of the first vehicle, and the tilt angle of the optical axis of an optical picture information generating device such as a TV camera is obtained on the basis of the determined vanishing point to thereby detect the distance to a designated position in which the second vehicle will appear.

SUMMARY OF THE INVENTION

The present invention provides a method for determining an installed angular magnitude of an image acquiring apparatus. By means of acquiring characteristics with respect to an image of a calibrating tool, and utilizing a predetermined angular magnitude of the image acquiring apparatus as an initial value, an iteration calculation is performed for obtaining an accurate installed angle of the image acquiring apparatus automatically.

The present invention provides a vehicle collision warning system for detecting a relative distance between the carrier and other vehicles according to an installed angle associated with an image acquiring apparatus installed on an angular stationary device for supporting the image acquiring apparatus within an predetermined angular range so that an iteration calculation is capable of being performed to obtain the convergent installed angle automatically. The system is capable of obtaining the installed angle of the image acquiring apparatus immediately and accurately without any need to move the vehicle on roadway so as to bring conveniences for subsequently relative distance estimation.

In one embodiment, the present invention provides a method for determining installed angle of image acquiring apparatus, comprising steps of: arranging an image acquiring apparatus on a carrier within a predetermined angular range; acquiring an image of a calibrating tool by the image acquiring apparatus; calculating a position of a feature of the image with respect to the calibrating tool according to an image coordinate system and a characteristic value of the feature of the calibrating tool associated with a spatial coordinate system; and performing an iterative angle-calculating procedure according to the position and the characteristic value for obtaining an installed angle of the image acquiring apparatus.

In another embodiment, the present invention further provides a vehicle collision system, comprising: an image acquiring apparatus for acquiring an image surrounded a carrier; an image processing and controlling unit for calculating a position of a feature of the image with respect to the calibrating tool according to an image coordinate system and a characteristic value of the feature of the calibrating tool associated with a spatial coordinate system, performing an iterative angle-calculating procedure according to the position and the characteristic value for obtaining an installed angle of the image acquiring apparatus, and analyzing a relative distance calculated according to the image, the installed angle and installed height of the image acquiring apparatus, between the carrier and objectives around so as to determine if it is necessary to generate an alarm signal; a display unit, electrically coupled to the image processing and controlling unit, for displaying the image; and an alarm unit, electrically coupled to the image processing and controlling unit, for receiving the alarm signal to generate an alarm message.

BRIEF DESCRIPTION OF THE DRAWINGS

The present invention will become more fully understood from the detailed description given herein below and the accompanying drawings which are given by way of illustration only, and thus are not limitative of the present invention and wherein.

DESCRIPTION OF THE EXEMPLARY EMBODIMENTS

For your esteemed members of reviewing committee to further understand and recognize the fulfilled functions and structural characteristics of the invention, several exemplary embodiments cooperating with detailed description are presented as the follows.

Figure 1A:
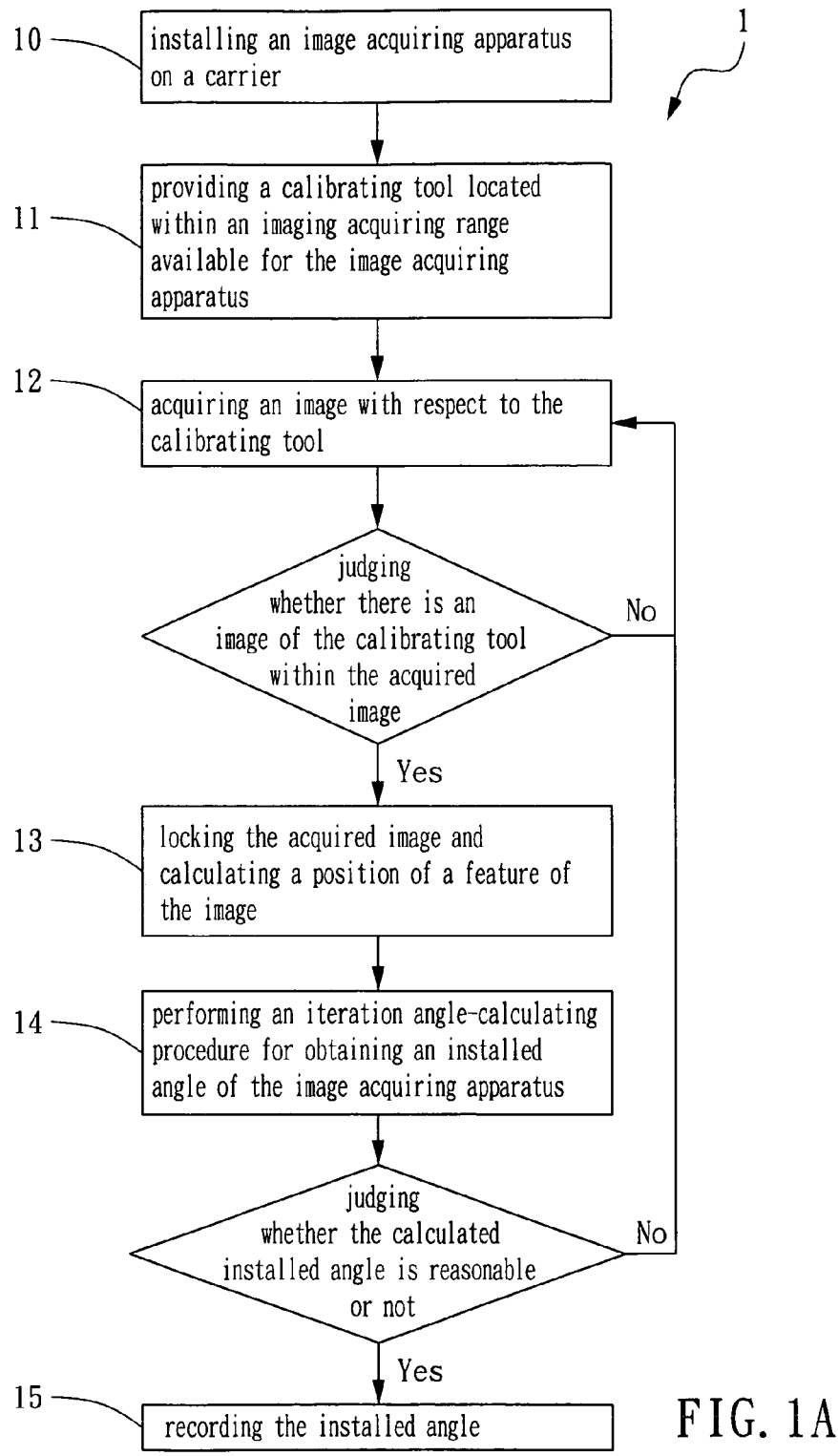
FIG. 1A and FIG. 1B illustrate a process flow chart representing an embodiment of the method for determining installed angle of an image acquiring apparatus of the present invention.

Please refer to the FIG. 1a, which is a process flow chart representing an embodiment of the method for determining installed angle of an image acquiring apparatus of the present invention. The method 1 in FIG. 1a is started at step 10. In step 10, process is performed to install an image acquiring apparatus on a carrier. The image acquiring apparatus is installed on the carrier within a predetermined angular range. In the step 10, the carrier can be, but should not be limited to, a vehicle or other transportation apparatus. Meanwhile, the location where the image acquiring apparatus is installed may include, but should not limited to, the front side of the carrier, rear side of the carrier, left side of the carrier, right side of the carrier or the combination of the foregoing sides. As to the way to install the image acquiring apparatus within the predetermined angular range is capable of being implemented by many prior arts, which are known by the one of skilled in the art. In the present embodiment of the present invention, an angular stationary device is adapted for supporting the image acquiring apparatus within the predetermined angular range.

Figure 2:
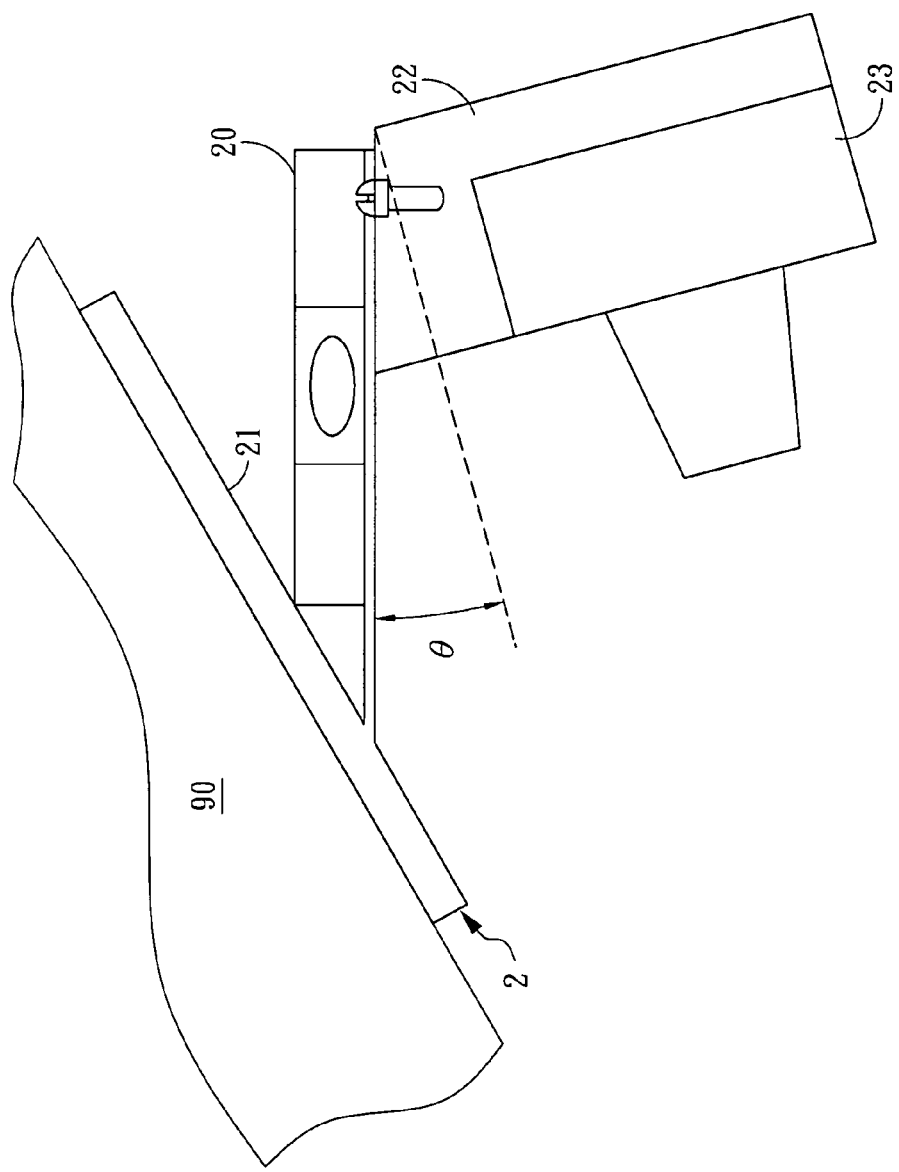
FIG. 2 illustrates installation of an image acquiring apparatus in the present invention.

Please refer to FIG. 2, which is an embodiment of the angular stationary device of the present invention. In the embodiment, the angular stationary device 2 disposed on the carrier 90 has a base frame 21 and a bubble gauge disposed on the base frame 21. In addition, the angular stationary device 2 further has a supporting mechanism 22, connected to the base frame 21. The supporting mechanism 22 is capable of supporting the image acquiring apparatus 23 in a predetermined angle θ related to the horizontal axis of the bubble gauge. Therefore, theoretically, when the angular stationary device 2 is installed on the carrier 90, it is capable of lightly adjusting the bubble gauge, i.e. bubble in the center of the bubble to keep the horizontal axis of the bubble gauge parallel to the horizontal ground plane so as to make the angle between the image acquiring apparatus 23 and ground plane equal to the predetermined angle θ.

Since there exists a tolerance during the manufacturing, assembling the angular stationary device 2 on the carrier 90 or assembling the image acquiring apparatus 23 on the angular stationary device 2, the predetermined angle θ of the angular stationary device 2 may not be equal to ideal value. Therefore, the predetermined angle θ with respect to the angular stationary device 2 may be within the tolerance which is called the predetermined angular range in the present invention. For example, if the ideal predetermined angle θ is 3 degree, practically, the angle θ might be a value between 2.8 degree to 3.5 degree after the manufacturing or assembly. The embodiment shown in FIG. 2 is just an example for illustrating a way to make the image acquiring apparatus be installed at the predetermined angle θ, and the way should not be a limitation of the present invention.

Figure 3A:
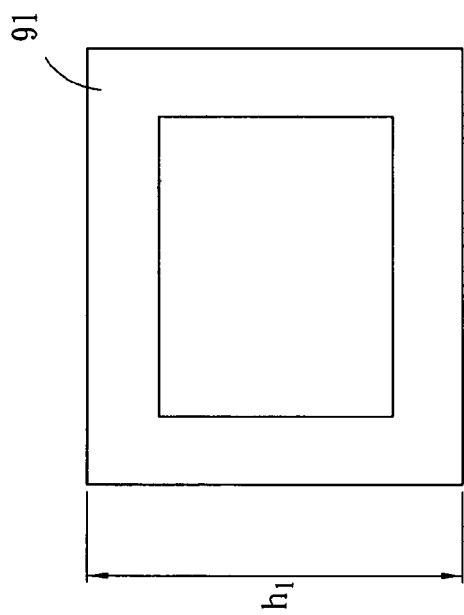
FIG. 3A is a drawing illustrates a calibrating tool.
Figure 3B:
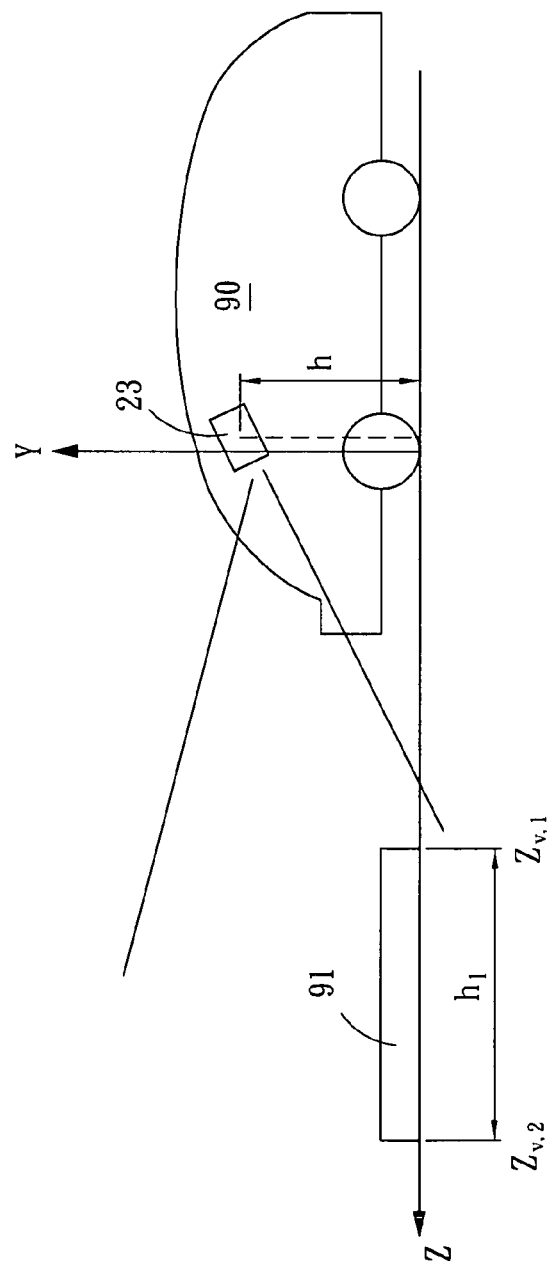
FIG. 3B illustrates the relationship between a calibrating tool and a carrier of the present invention.

Refer back to FIG. 1a, a step 11 is performed to provide a calibrating tool located within an image acquiring range available for the image acquiring apparatus. Afterward, the method is proceeded to step 12 for acquiring an image with respect to the calibrating tool by using the image acquiring apparatus. FIGS. 3a and 3b illustrates a drawing of the calibrating tool and the relationship between the calibrating tool and the carrier of the present embodiment respectively. The external appearance of the calibrating tool 91 is square and the dimensions of the calibrating tool 91 are already known, wherein the dimensions or the external appearance of the calibrating tool 91 can be adapted depending on requirements. In the step 12, taking the image acquiring apparatus 23 disposed on a front side of the carrier 90 as an example, the calibrating tool 91 is laid on the ground in front of the carrier 90. Since the calibrating tool 91 and the carrier 90 are in the same space, a spatial coordinate system is defined for describing the characteristic of the carrier 90 and the calibrating tool 91 so that the subsequent relative distance estimation is capable of being described according to the spatial coordinate system.

Referring back to FIG. 1a, after acquiring the image of the calibrating tool, a step is performed to judge whether there is an image of the calibrating tool within the acquired image obtained in step 12 or not. If there is no calibrating tool image, step 12 is executed again; otherwise, the method is proceed to step 13 for locking the acquired image and calculating a position of a feature of the image with respect to the calibrating tool according to an image coordinate system and a characteristic value of the feature of the calibrating tool associated with the spatial coordinate system respectively, wherein the feature is a lateral side of the calibrating tool 91 having width $h_1$ along Z axis of the spatial coordinate system shown in FIG. 3b in the present embodiment.

Figure 4:
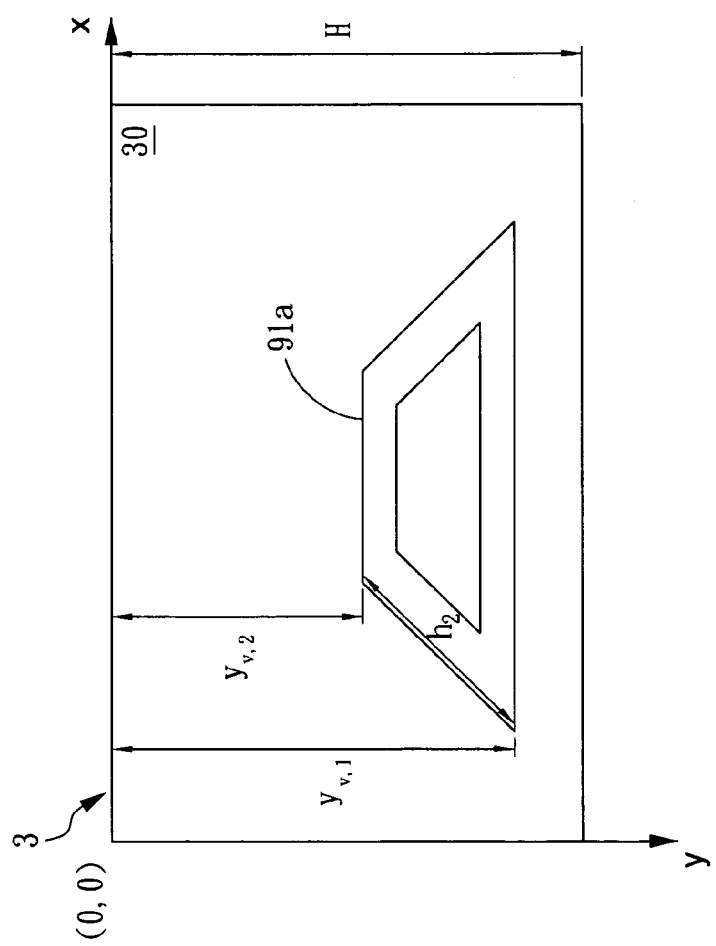
FIG. 4 illustrates a calibrating tool image and a coordinate system corresponding to the calibrating tool image.

Besides, please refer to FIG. 4, which illustrates the calibrating tool image and the image coordinate system corresponding to the calibrating tool image. The image coordinate system in step 13 refers to a coordinate system defined according to the display area of a display unit 3 for displaying the image 91a of the calibrating tool acquired by the image acquiring apparatus. The coordinate position in step 13 refers to a boundary coordinate position $(y_{v,1}, y_{v,2})$ with respect to upper and lower end of lateral side of image 91a with respect to the calibrating tool 91 along y axis of the image coordinate system 30 while the characteristic value is width $h_1$ of the calibrating tool 91 defined by $Z_{v,2}-Z_{v,1}$ shown in FIG. 3b wherein $Z_{v,1}$ and $Z_{v,2}$ are both the boundary location with respect to the width $h_1$ of the calibrating tool along Z axis of the spatial coordinate system.

Referring back to FIG. 1a, step 14 is executed after step 13 for performing an iterative angle-calculating procedure according to the position and the characteristic value for obtaining an installed angle of the image acquiring apparatus, wherein the installed angle is an included angle defined between the central axle of the image acquiring apparatus and the horizontal plane. Please refer to FIG. 1b, which is a flow chart illustrating the iterative angle-calculating procedure of the present invention. The procedure is started at step 140 to determine a relation between the installed angle and a ratio factor, a focal length (f) of the image acquiring apparatus, the coordinate position $(y_{v,1}, y_{v,2})$, the characteristic value $(Z_{v,2}-Z_{v,1})$, an installed height (h) of the image acquiring apparatus, and vertical pixel numbers (H) of a display unit showing the image acquired by the image acquiring apparatus. The relation is shown as equation (1) and (2):

$$f(\theta) = \frac{h\left(fS_y\cos\theta - \left(y_{v,2} - \frac{H}{2}\right)\sin\theta\right)}{fS_y\sin\theta + \left(y_{v,2} - \frac{H}{2}\right)\cos\theta} - \qquad (1)$$

$$\frac{h\left(fS_y\cos\theta - \left(y_{v,1} - \frac{H}{2}\right)\sin\theta\right)}{fS_y\sin\theta + \left(y_{v,1} - \frac{H}{2}\right)\cos\theta} - (Z_{v,2} - Z_{v,1})$$

$$= 0$$

$$\theta_{n+1} = \theta_n - \frac{f(\theta_n)}{f'(\theta_n)} \qquad (2)$$

wherein
$S_y$ refers a ratio factor (pixel/meter);
f refers to the focal length of the image acquiring apparatus (meter);
θ refers to an included angle between the axle of the image acquiring apparatus and the ground plane;
H refers to the vertical pixel numbers of the display unit;
h refers to installed height of the image acquiring apparatus on the carrier;
$y_{v,2}$ refers to the coordinate position of upper horizontal boundary associated with the calibrating tool along y axis of the image coordinate system;
$y_{v,1}$ refers to the coordinate position of lower horizontal boundary associated with the calibrating tool along y axis of the image coordinate system;
$Z_{v,2}$ refers to the coordinate position of upper horizontal boundary associated with the calibrating tool along Z axis of the spatial coordinate system;
$Z_{v,1}$ refers to the coordinate position of lower horizontal boundary associated with the calibrating tool along Z axis of the spatial coordinate system.

Figure 5:
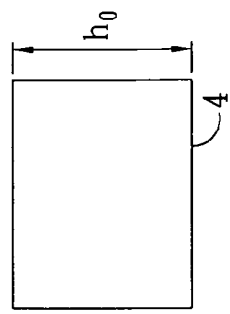
FIG. 5 illustrates an image sensor disposed in an image acquiring apparatus.

According to the relation of equation (1) and (2), step 141 is performed to calculate a ratio factor with respect to the image acquiring apparatus. As illustrated in FIG. 4 and FIG. 5, the ratio factor with respect to the image acquiring apparatus is a ratio of the total vertical pixel numbers (H) of the display unit to the height ($h_0$) of image sensor 4 such as CMOS or CCD of the image acquiring apparatus. For example, if the display resolution of the display unit is 1024 (pixels)×768 (pixels), then H is 768 (pixels). On the other hand, if the dimension of image sensor 4 is 3.2 mm×2.4 mm, then the $h_0$ is 2.4 mm. Accordingly, the ratio factor $S_y$, in this embodiment, equals to 768/0.0024=320000 (pixel/meter) It should be mentioned here that the dimension of image sensor 4 and the resolution of the display unit should not be limited to the foregoing value because the specification of display resolution or the dimension of image sensor is chosen according to the requirement of the user.

Afterward, step 142 is executed for substituting the value of the ratio factor, focal length of the image acquiring apparatus, the position, the characteristic value, installed height of the image acquiring apparatus, and vertical pixel numbers of the display unit into the relation, i.e. equation (1). And then step 143 is performed to iterate the equation (1) according to the equation (2), which represents the Newton's method. In the step 143, the initial value for iterating can be picked within the predetermined angular range. After several times of iteration, a converged and accurate value is capable of being obtained for representing the installed angle of the image acquiring apparatus.

Please refer to FIG. 1*a*, after obtaining the converged installed angle of the image acquiring apparatus, it further judges whether the calculated angle is reasonable or not. If the calculated angle is not converged to a value within the predetermined angular range of the angular stationary device, the installed angle obtained from the step 143 is not reasonable so that the flow is back to step 12 and the process flow continues to repeat the step 12 to step 14 for obtaining a new value. On the contrary, if the installed angle calculated by step 14 is reasonable, step 15 is performed to record the installed angle.

Figure 6:
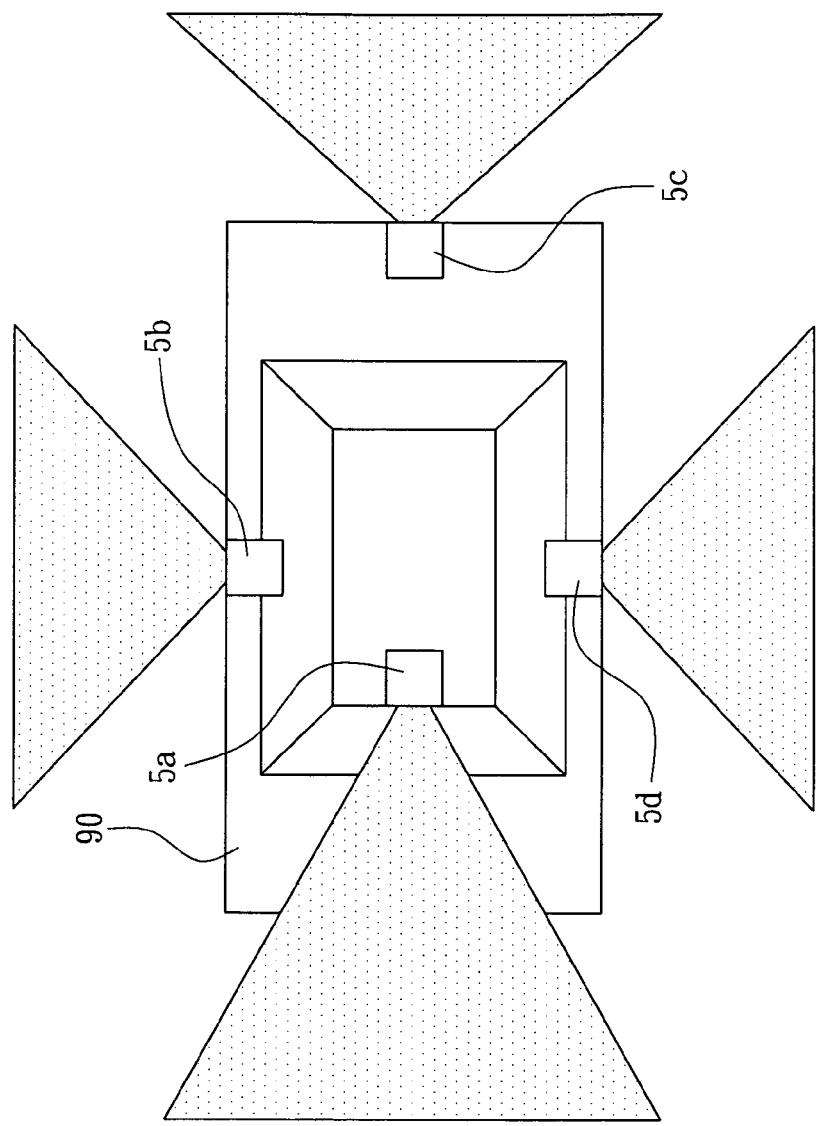
FIG. 6 illustrates locations for installing an image acquiring apparatus.

Although the foregoing embodiment for obtaining installed angle is iterated according the arrangement illustrated in FIG. 2 and FIG. 3*b*, the location of the image acquiring apparatus should not be limited to the front side of the carrier. FIG. 6 illustrates an alternative example where the image acquiring apparatus 5*a*~5*d* are available for being arranged on the other sides of the carrier 90 such as rear, lateral side or the combination thereof. The method for determining the installed angle of the image acquiring apparatus on rear side and/or lateral side is the same as the flow shown in FIGS. 1*a* and 1*b*. In addition, the image acquiring apparatus 5*a*~5*d* can be, but should not be limited to, a video camera or an infrared image acquiring apparatus, wherein the video camera may be a charge-coupled device (CCD) video camera or a complementary metal-oxide semiconductor (CMOS) video camera.

Figure 7:
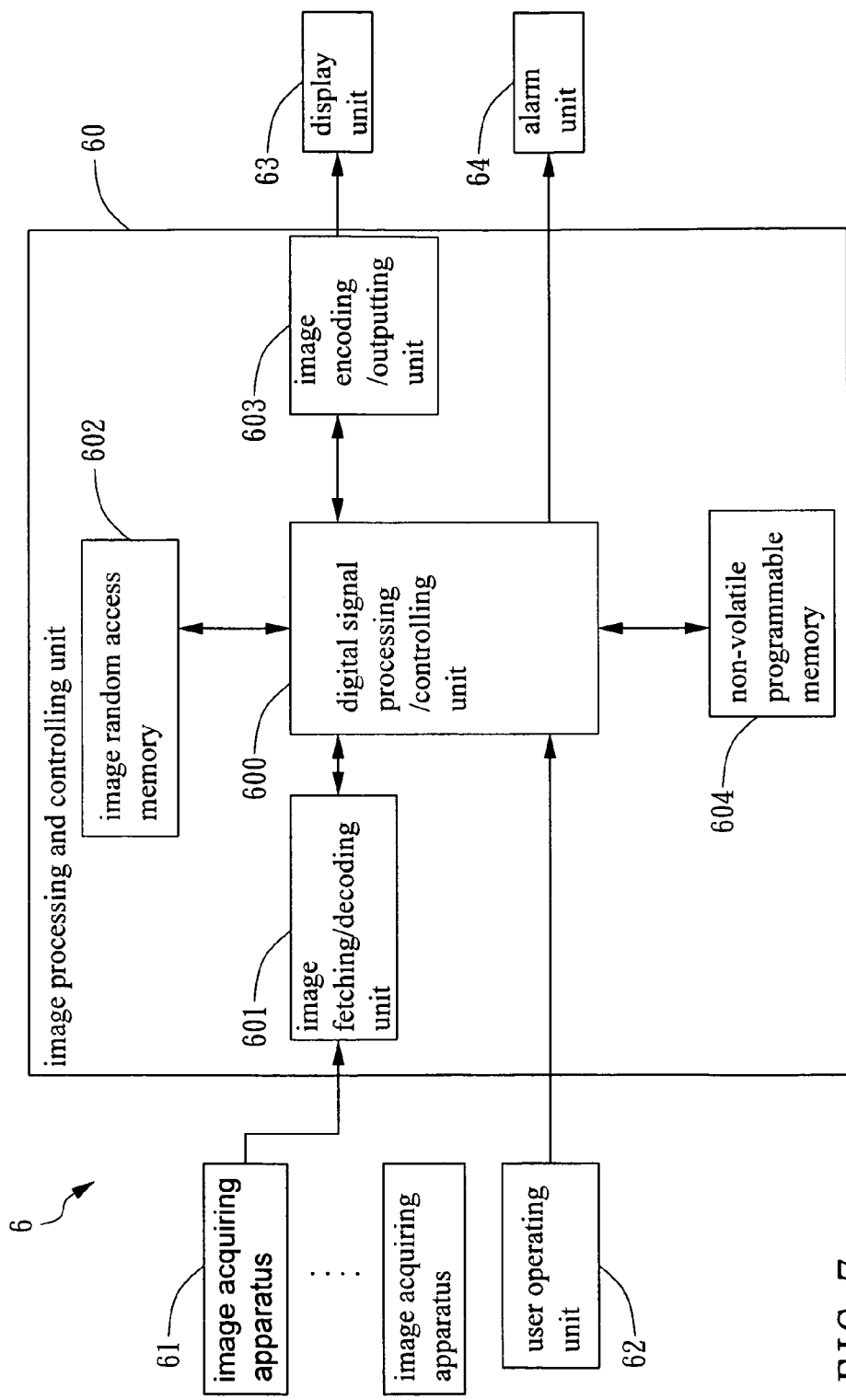
FIG. 7 illustrates a block diagram representing an embodiment of a carrier collision warning system of the present invention.

According to the foregoing method, the present further provides a vehicle collision warning system. Please refer to FIG. 7, which is a block diagram representing an embodiment of the vehicle collision warning system of the present invention. The system 6 comprises at least one image acquiring apparatus 61, an image processing and controlling unit 60, a display unit 63, and an alarm unit 64. The at least one image acquiring apparatus 61 is adapted for acquiring the image around the vehicle for acquiring a image surrounded the vehicle. The image processing and controlling unit 60 functions to perform step 13 and 14 for calculating a position of a feature of the image with respect to the calibrating tool according to an image coordinate system and a characteristic value of the feature of the calibrating tool associated with a spatial coordinate system, performing an iterative angle-calculating procedure according to the position and the characteristic value for obtaining an installed angle of the image acquiring apparatus 61, and analyzing a relative distance calculated according to the image, the installed angle and installed height of the image acquiring apparatus 61 between the vehicle and objectives around the vehicle so as to determine if it is necessary to generate an alarm signal.

The display unit 63, electrically connected to the image processing and controlling unit 60, is adapted for displaying image and data information according to the signals from the image processing and controlling unit 60. The image and data information, for example, can be, but should not be limited to, vehicle tracing images or relative distance with other vehicles. The display unit 63 can be, but should not be limited to, a liquid crystal display, or a light emitting diodes display. The alarm unit 64, coupled to the image processing and controlling unit 60, is utilized to receive the alarm signal so as to generate the corresponding alarm message for reminding driver that the distance between the vehicle and other vehicles around is too close. The alarm unit 64 is capable of generating sound message, light message or vibrating message for informing the driver. In addition, alarm unit 64 enables to generate an alarm image for informing driver by means of the display unit 63.

Figure 1B:
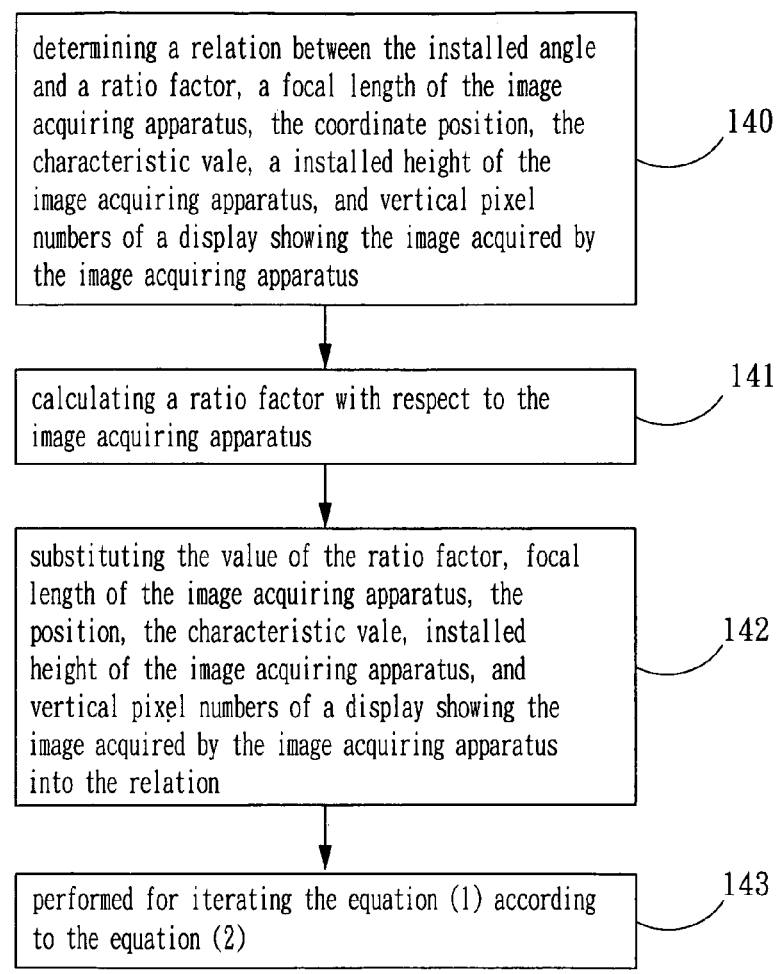

The system 6 further has a user operating unit 62 for providing an operating interface whereby for starting or configuring the system 6, and starting to perform the iterative angle-calculating procedure or vehicle tracing and relative distance measuring procedure. The flow for the iterative angle-calculating procedure is shown in FIG. 1b, while the relative distance measuring procedures function to detect the relative distance between the vehicle and objects around so as to keep safety of the moving vehicle.

The image processing and controlling unit 60 further includes an image fetching/decoding unit 601, a digital signal processing/controlling unit 600, and image encoding/outputting unit 603. The image fetching/decoding unit 601, coupled to the image acquiring apparatus 61, functions to convert information signal acquired by the image acquiring apparatus 61 into a digital image information. The digital signal processing/controlling unit 600 is adapted for analyzing and calculating the digital image information so as to obtain the installed angle and the relative distance. The image encoding/outputting unit 603, coupled to the digital signal processing/controlling unit 600 and the displaying unit 63, is adapted to perform image encoding and thus output an output image data to the displaying unit 63 according to a control signal from the digital signal processing/controlling unit 600.

Besides, the image processing and controlling unit 60 further has an image random access memory 602, and a non-volatile programmable memory 604. The image random access memory 602 is adapted to store the digital image information and a processed image data processed by the digital signal processing/controlling unit 600 and provide the digital image information to the digital signal processing/controlling unit 600 and the processed image information to the image encoding/outputting unit 603, while the non-volatile programmable memory 604 is utilized to register the installed angle with respect to the image acquiring apparatus 61 analyzed by the digital signal processing/controlling unit 600.

When the driver selects the mode of vehicles tracing and relative distance measuring procedure through the user-operating unit 62, the image processing and controlling unit 60 enables to identify and trace the other vehicles around and estimate the relative distance between the vehicle and other vehicles around according to the installed angle and the image obtained from the image requiring apparatus 61. Then, the image processing and controlling unit 60 adds information of the installed angle, and the relative distance on the digital image information so as to form a new digital image information and store the new digital image information into the image random access memory 604. The digital image information stored in the image random access memory 602 is transmitted to the image encoding/outputting unit 603 whereby for transforming the digital image information into an output image data available for the display unit 63. The display unit 63 displays the vehicles tracing images and information of relative distance on the screen.

What is claimed is:

1. A method for determining installed angle of image acquiring apparatus, comprising steps of:

arranging an image acquiring apparatus on a carrier within a predetermined angular range;

acquiring an image of a calibrating tool by the image acquiring apparatus, wherein the image acquiring apparatus is disposed on the carrier by an angular stationary device so that the imaging acquiring apparatus is capable of being installed within the predetermined angular range;

calculating a position of a feature of the image with respect to the calibrating tool according to an image coordinate system and a characteristic value of the feature of the calibrating tool associated with a spatial coordinate system; and performing an iterative angle-calculating procedure according to the position and the characteristic value for obtaining an installed angle of the image acquiring apparatus, wherein the iterative angle-calculating procedure comprises steps of:

determines a relation between the installed angle and a ratio factor, a focal length of the image acquiring apparatus, the position, the characteristic value, an installed height of the image acquiring apparatus, and vertical pixel numbers of a display unit showing the image acquired by the image acquiring apparatus;

calculating the ratio factor with respect the image acquiring apparatus;

substituting the value of the ratio factor, focal length of the image acquiring apparatus, the position, the characteristic value, installed height of the image acquiring apparatus, and vertical pixel numbers of the display unit showing the image acquired by the image acquiring apparatus into the relation; and obtaining a convergent installed angle of the image acquiring apparatus by iterating several times;

wherein the characteristic value is a numerical difference derived from the coordinate position of the upper horizontal boundary associated with the calibrating tool and the lower horizontal boundary associated with the calibrating tool, and the relation is defined as:

$$f(\theta) = \frac{h\left(fS_y\cos\theta - \left(y_{v.2} - \frac{H}{2}\right)\sin\theta\right)}{fS_y\sin\theta + \left(y_{v.2} - \frac{H}{2}\right)\cos\theta} -$$

$$\frac{h\left(fS_y\cos\theta - \left(y_{v.1} - \frac{H}{2}\right)\sin\theta\right)}{fS_y\sin\theta + \left(y_{v.1} - \frac{H}{2}\right)\cos\theta} - (Z_{v.2} - Z_{v.1}),$$

where $S_y$ refers to a ratio factor, f refers to the focal length of the image acquiring apparatus, θ refers to an included angle between the axle of the image acquiring apparatus and the ground plane, H refers to the vertical pixel numbers of the display unit, h refers to installed height of the image acquiring apparatus on the carrier, $y_{v,1}$ refers to the coordinate position of lower horizontal boundary associated with the calibrating tool along the y axis of the image coordinate system, $y_{v,2}$ refers to the coordinate position of upper horizontal boundary associated with the calibrating tool along y axis of the image coordinate system, $Z_{v,1}$ refers to the coordinate position of lower horizontal boundary associated with the calibrating tool along Z axis of the spatial coordinate system, and $Z_{v,2}$ refers to the coordinate position of upper horizontal boundary associated with the calibrating tool along Z axis of the spatial coordinate system, and the iterating is performed according to $$\theta_{n+1} = \theta_n - \frac{f(\theta_n)}{f'(\theta_n)}.$$

2. The method of claim 1 wherein an image sensor of the image acquiring apparatus is substantially a charge-coupled device or a complementary metal-oxide semiconductor.

3. The method of claim 1 wherein the image acquiring apparatus is substantially an infrared image-sensing device.

4. The method of claim 1 wherein the angular stationary device further includes a bubble gauge disposed thereon.

5. The method of claim 1 wherein an initial value for iterating is an angular magnitude selected within the predetermined angular range.

6. The method of claim 1 wherein the ratio factor is defined as a ratio of the vertical pixel numbers of the display unit and height of an image sensor of the image acquiring apparatus.

7. The method of claim 1 wherein the carrier is a vehicle.

8. The method of claim 1 wherein the image acquiring apparatus is capable of being disposed at a position selected from a group consisting of the front side of the carrier, the rear side of the carrier, lateral side of the carrier and the combination thereof.

9. The method of claim 1 wherein the iterative angle-calculating procedure further comprises steps of:
determining a relation between the installed angle and a ratio factor, a focal length of the image acquiring apparatus, the position, the characteristic value, an installed height of the image acquiring apparatus, and vertical pixel numbers of a display unit showing the image acquired by the image acquiring apparatus;
substituting the value of the ratio factor, focal length of the image acquiring apparatus, the position, the characteristic value, installed height of the image acquiring apparatus, and vertical pixel numbers of the display unit showing the image acquired by the image acquiring apparatus into the relation; and
obtaining a convergent installed angle of the image acquiring apparatus by iterating several times.

10. The method of claim 9 wherein the ratio factor is defined as a ratio of the vertical pixel numbers of the display unit and height of an image sensor of the image acquiring apparatus.

11. The method of claim 9 wherein an initial value for iterating is an angular magnitude selected within the predetermined angular range.

12. The method of claim 1 wherein the position is substantially a boundary coordinate position of the feature.

13. The method of claim 1 wherein the characteristic value is a width of lateral side of the calibrating tool.

14. A vehicle collision system, comprising:
an image acquiring apparatus for acquiring an image surrounded a vehicle;
an image processing and controlling unit for calculating a position of a feature of the image with respect to the calibrating tool according to an image coordinate system and a characteristic value of the feature of the calibrating tool associated with a spatial coordinate system, performing an iterative angle-calculating procedure according to a relation between the position and the characteristic value for obtaining an installed angle of the image acquiring apparatus, and analyzing a relative distance calculated according to the image, the installed angle and installed height of the image acquiring apparatus, between the vehicle and objectives around the vehicle so as to determine if it is necessary to generate an alarm signal;
a display unit, electrically coupled to the image processing and controlling unit, for displaying the image; and
an alarm unit, electrically coupled to the image processing and controlling unit, for receiving the alarm signal to generate an alarm message;
wherein the characteristic value is a numerical difference derived from the coordinate position of the upper horizontal boundary associated with the calibrating tool and the lower horizontal boundary associated with the calibrating tool, and the relation is defined as:

$$f(\theta) = \frac{h\left(fS_y\cos\theta - \left(y_{v,2} - \frac{H}{2}\right)\sin\theta\right)}{fS_y\sin\theta + \left(y_{v,2} - \frac{H}{2}\right)\cos\theta} - \frac{h\left(fS_y\cos\theta - \left(y_{v,1} - \frac{H}{2}\right)\sin\theta\right)}{fS_y\sin\theta + \left(y_{v,1} - \frac{H}{2}\right)\cos\theta} - (Z_{v,2} - Z_{v,1}),$$

where $S_y$ refers to a ratio factor, f refers to the focal length of the image acquiring apparatus, $\theta$ refers to an included angle between the axle of the image acquiring apparatus and the ground plane, H refers to the vertical pixel numbers of the display unit, h refers to installed height of the image acquiring apparatus on the carrier, $y_{v,1}$ refers to the coordinate position of lower horizontal boundary associated with the calibrating tool along the y axis of the image coordinate system, $y_{v,2}$ refers to the coordinate position of upper horizontal boundary associated with the calibrating tool along y axis of the image coordinate system, $Z_{v,1}$ refers to the coordinate position of lower horizontal boundary associated with the calibrating tool along Z axis of the spatial coordinate system, and $Z_{v,2}$ refers to the coordinate position of upper horizontal boundary associated with the calibrating tool along Z axis of the spatial coordinate system, and the iterating is performed according to $$\theta_{n+1} = \theta_n - \frac{f(\theta_n)}{f'(\theta_n)}.$$

15. The system of claim 14 wherein an image sensor of the image acquiring apparatus is substantially a charge-coupled device or a complementary metal-oxide semiconductor.

16. The system of claim 14 wherein the image acquiring apparatus is substantially an infrared image-sensing device.

17. The system of claim 14 wherein the image acquiring apparatus is capable of being disposed at a position selected from a group consisting of the front side of the vehicle, the rear side of the vehicle, lateral side of the vehicle and the combination thereof.

18. The system of claim 14 wherein the alarm message is capable of being a sound message, a light, or a vibration.

19. The system of claim 14 further comprising a user operating unit for providing a operating interface whereby for starting the system, and starting to perform the iterative angle-calculating procedure or vehicle tracing and relative distance measuring procedure.

20. The system of claim 14, wherein the image processing and controlling unit further comprises:
an image fetching/decoding unit, coupled to the image acquiring apparatus, for converting information acquired by the image acquiring apparatus into a digital image information;
a digital signal processing/controlling unit, for analyzing and calculating the digital image information so as to obtain the installed angle and the relative distance; and
an image encoding/outputting unit, coupled to the digital signal processing/controlling unit and the displaying unit, for image encoding and thus outputting an output image data to the displaying unit according to a control signal from the digital signal processing/controlling unit.

21. The system of claim 20, wherein the image processing and controlling unit further comprises:
    an image random access memory, for storing the digital image information and a processed image data processed by the digital signal processing/controlling unit and providing the digital image information to the digital signal processing/controlling unit and the processed image information to the image encoding/outputting unit; and
    a non-volatile programmable memory, for registering the installed angle with respect to the image acquiring apparatus analyzed by the digital signal processing/controlling unit.

22. The system of claim 21, wherein the digital signal processing/controlling unit enables to add information of the installed angle, or the relative distance on the digital image information so as to form a new digital image information and store the new digital image information into the image random access memory.

23. The system of claim 14, wherein the alarm unit enables to generate an alarm image displayed by the display unit for informing driver.

* * * * *